(12) United States Patent
Thiele et al.

(10) Patent No.: US 7,246,949 B2
(45) Date of Patent: Jul. 24, 2007

(54) DEVICE FOR TRANSMITTING OPTICAL SIGNALS

(75) Inventors: Hans Thiele, Fuerstenfeldbruck (DE); Hans Poisel, Leinburg (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 0 days.

(21) Appl. No.: 10/311,860

(22) PCT Filed: Jun. 18, 2001

(86) PCT No.: PCT/DE01/02247

§ 371 (c)(1),
(2), (4) Date: Jul. 29, 2003

(87) PCT Pub. No.: WO01/98801

PCT Pub. Date: Dec. 27, 2001

(65) Prior Publication Data

US 2004/0017984 A1    Jan. 29, 2004

(30) Foreign Application Priority Data

Jun. 20, 2000 (DE) ................................ 100 29 206

(51) Int. Cl.
*G02B 6/26* (2006.01)

(52) U.S. Cl. ..................... 385/54; 385/53; 385/71; 385/87; 385/130

(58) Field of Classification Search ................. 385/49, 385/76, 88, 89, 92, 130, 132, 134; 151/179
See application file for complete search history.

(56) References Cited

U.S. PATENT DOCUMENTS

| | | | |
|---|---|---|---|
| 4,027,945 A | 6/1977 | Iverson | |
| 4,109,997 A | 8/1978 | Iverson | |
| 4,109,998 A | 8/1978 | Iverson | |
| 4,258,976 A | 3/1981 | Scott et al. | |
| 4,447,114 A | 5/1984 | Koene | |
| 4,772,093 A * | 9/1988 | Abele et al. | 385/119 |
| 4,872,737 A | 10/1989 | Fukahori et al. | |
| 4,943,137 A | 7/1990 | Speer | |
| 5,157,745 A | 10/1992 | Ames | |
| 5,257,332 A | 10/1993 | Pimpinella | |
| 5,311,535 A | 5/1994 | Karpinski | |
| 5,371,814 A * | 12/1994 | Ames et al. | 385/25 |

(Continued)

FOREIGN PATENT DOCUMENTS

DE      32 07 469      9/1982

(Continued)

OTHER PUBLICATIONS

E. G. Peak et al., "Ultrafast Non-Mechanical Image Rotation Using an Acousto-optic Dove Prism (AODP)", Optics in 1997. Opt. Lett. 22 1195:1997.

(Continued)

*Primary Examiner*—David A. Vanore
(74) *Attorney, Agent, or Firm*—Kevin L. Daffer; Daffer McDaniel, LLP (57) ABSTRACT

The invention relates to a device for transmitting optical signals between at least two components disposed for rotation.

The invention excels itself by the provision that at least one micro-optical component is used for beam forming or beam guidance.

12 Claims, 3 Drawing Sheets

U.S. PATENT DOCUMENTS

| | | | |
|---|---|---|---|
| 5,442,721 A | 8/1995 | Ames | |
| 5,535,294 A | 7/1996 | Kamuz et al. | |
| 5,621,830 A | 4/1997 | Lucey et al. | |
| 5,872,879 A | 2/1999 | Hamm | |
| 5,905,824 A * | 5/1999 | Delisle et al. | 385/15 |
| 5,940,562 A * | 8/1999 | Henson et al. | 385/88 |
| 5,996,376 A * | 12/1999 | Johnson et al. | 65/406 |
| 6,445,939 B1 * | 9/2002 | Swanson et al. | 600/342 |

FOREIGN PATENT DOCUMENTS

| | | |
|---|---|---|
| DE | 34 11 121 | 10/1985 |
| DE | 4101043 | 8/1992 |
| EP | 0 111 390 | 1/1988 |
| EP | 0 488 205 | 7/1997 |
| JP | 59-105608 | 6/1984 |
| JP | 60-218609 | 11/1985 |
| JP | 2687723 | 7/1992 |
| JP | 2780487 | 7/1992 |
| JP | 7-104460 | 4/1995 |

OTHER PUBLICATIONS

International Search Report dated Mar. 5, 2002.

XP-001057754, J. Alexander Speer et al., The diversity of fiber optic rotary connectors (slip rings), *SPIE* vol. 839 Components for Fiber Optic Applications II (1987), pp. 122-128.

XP-002192126, Eung Gi Paek et al., Nonmechanical image rotation with an acousto-optic dove prism, *Optics Letters*, vol. 22, No. 15 (1997) pp. 1195-1197.

XP-002192125, Michael Snowbell et al., Efficient Self-Aligning Multibeam Coupling into a Single-Mode Fiber, *Journal of Lightwave Technology*, vol. 13, No. 1, (Jan. 1995), pp. 55-61.

XP-000500603, Von Roland Mueller-Fiedler et al. Optoelektronische Mikrosysteme, *Bosch Technische Berichte*, No. 56, (1994), pp. 11-25.

Search Report.

* cited by examiner

DEVICE FOR TRANSMITTING OPTICAL SIGNALS

BACKGROUND OF THE INVENTION

The present invention relates to a device for transmitting optical signals, particularly via interfaces between components mobile for rotation or translation.

In many applications with optical data transmission using optical waveguides, a transmission via rotating interfaces is also required. To this end, various appropriate single-channel transmission systems have become known in the prior art. As the data rates increase, the number of channels to be transmitted is also increased. Hence the fields of application for multi-channel transmission systems have gone through a strong expansion.

When cable drums with optical waveguides in the cable are used, for example, in which data must be transmitted via the optical waveguides while the cable is reeled off or wound onto the drum, an optical multi-channel transmitter is necessary. Such cable drums are employed, for instance, in remotely operated vehicles (ROV) for movement on land or at sea (bomb deactivation drone, diving robots in offshore industry) or as sonar towed vehicles trailing behind ships for surveying the sea floor. Examples of other fields of application for multi-channel transmitter are rotatable remote prospecting and reconnaissance instruments for civil, scientific and military applications, which generate high data streams (radar, IR/visual, etc.), such as camera heads under helicopters, unmanned aerial vehicles (UAV), large-scale telescopes, satellites.

The on-board application in ships and aircraft requires a sturdy design (shocks and vibrations), especially as far as the adjustment stability is concerned (which is obviously easier to realize in a small number of small components than in a great number of large ones). In the case of aircraft, particularly in drone missiles, a low weight and small dimensions constitute an additional decisive criterion that is hardly satisfied by the solutions so far known.

Numerous approaches to solutions are known for multi-channel rotary transmission. The essay by Speer and Koch "The diversity of fibre-optic rotary connectors" in: SPIE vol. 839, pp. 122–129, provides a sound survey.

The approaches to solutions can be classified as follows on principle:

1. Concentric fiber bundles in which the light of the respective channel to be transmitted is distributed among concentric (hollow) cylindrical optical waveguide arrays that can be rotated relative to each other at the interface as described in U.S. Pat. No. 4,027,945.

The essential disadvantage of this known array resides in the fact that the optical waveguides require increasing diameters as the respective channel is located farther to the outside. This system can be very well realized, for example, with synthetic optical waveguides. A transmission with single-mode fibers is practically precluded because these fibers can hardly be mounted in a sufficient number with a sufficient precision as a result of their extremely small core diameter. As the fiber diameter increases, the dispersion increases as well and hence the bandwidth or data rates that can be transmitted are reduced. This system does therefore not satisfy the demands on advanced data transmission systems requiring transmission in the Gbit/s range.

2. Coaxial imaging arrays are substantially based on the fact that a fixed (focal) point on the other side of the interface is associated with an emitting element rotating in an annular zone. The imaging function is implemented by an appropriate optical element such as a lens with different focal lengths for different annular zones (published in the laid-open German patent application DE 32 07 469 A1) or a holographic-optical element (published in the laid-open German patent application DE 197 80 642 A1).

The disadvantage of the first-mentioned known approach, i.e. the situation that all receiving fibers are disposed on the optical axis (OA) and that hence shading occurs, is avoided in the holographic-optical elements (HOE). However, the production of the HOE elements is presently still expensive when high efficiency ratios are required, and, due to the smaller angles of deviation in the preferably employed binary HOE elements, large structural dimensions are involved. For single-mode fibers, HOE elements can presently be used only with high losses. Moreover, this method can be applied in a unidirectional mode only. Advanced high-speed bus systems, however, principally require a bi-directional communication.

3. Imaging arrays with rotation compensation. Here, an optical element such as a Dove prism (described in U.S. Pat. No. 3,428,821) or a "de-rotation plate" (U.S. Pat. No. 4,258,976) rotating at precisely half the rotational speed compensates for the rotation. Hence, an array of the faces of the incoming fibers is projected onto the associated respective outgoing fibers.

The support and the drive of the de-rotating element with precisely half the rotational angular velocity, compared against the principal motion, require an expensive mechanical high-precision system. Moreover, the interposition of the de-rotating element requires long open light paths and high coupling losses involved. Specifically with the application of single-mode fibers an insufficient quality in optical transmission is achieved.

Among the transmission systems presented here, the two systems mentioned first must be ruled out for the majority of applications because they do not involve a sufficient bandwidth or because they permit only a unidirectional transmission. For this reason, the illustrated arrays with rotation compensation will preferably be discussed in the following description. Here, the nucleus consists in inverting optical elements that are rotated with half the angular velocity of the principal rotation. The light beams of the individual transmission channels may be inverted with an odd number of reflections by diffraction in a single axis only or by the shape of a pipe of optical conductors. The most important designs of an inverting optical element for these purposes, which are mentioned in literature, are as follows:

Dove prism
delta prism
Schmidt-Pechan prism
centrally mirrored sphere
inverting optical-fiber bundle (de-rotation plate)
axially mirrored gradient rod lens (slab lens).

The considerations of the optical systems described herein are not only applicable to systems rotating relative to each other but also to systems displaceable along an axis. In linearly displaceable systems, a de-rotating element is, of course, not necessary.

The optical systems used for coupling and decoupling have a decisive influence on the quality of the transmission systems described here. Various designs of these optical systems in correspondence with prior art, specifically those envisaged for the application of the third transmission technology operating on de-rotating elements, will be explained below. Even though the discussion will focus on exemplary glass fibers these considerations apply, by way of analogy, to other forms of optical waveguides as well, such as synthetic light-conducting fibers, or to active components such as transmitters or receivers.

U.S. Pat. No. 4,725,116 discloses a modular multi-channel transmission system. There, each channel is transmitted by a separate mirror. The mechanical complexity of this system is substantial because a separate optical system and a corresponding precise supporting system are required for each mirror. Apart therefrom, the length of the optical paths increase as the number of channels increases, which, in its turn, means an impairment of the optical characteristics. Moreover, attenuation peaks occur at those sites where the feeding fibers pass the optical path. Furthermore, the overall length and the weight increase in proportion to the number of channels. As a consequence, the unit grows to a size that is unacceptable for many applications with a small number of channels already.

U.S. Pat. No. 4,872,737 discloses a multi-channel transmitter operating on the basis of a Dove prism. Beam coupling or decoupling is performed by several separate collimators. These collimators must be adjusted individually. A precise adjustment requires a comparatively long mechanical lever or a fine thread that requires additional space, too. As a result, the area to be projected, i.e. the entire surface projected via the de-rotating system, increases as the number of channels and the precision in adjustment increases. Therefore, a larger optical system is necessary which, in its turn, displays a higher optical attenuation as a result of the longer paths and, at the same time, involves higher demands on the precision in adjustment. For this reason, the enlargement of a mechanical lever in such an approach, for example, for an increase of the precision in adjustment does not result in an improvement. As the number of channels increase, rather improved adjustment systems must be found which involve a higher precision in adjustment at the same space requirement. Here the rhomboid prism mirrors for beam deviation or parallel beam shift, which are equally proposed in that above-mentioned patent, offer one possible solution. Even though the application of a larger-size de-rotation system is therefore avoided, the additional optical path and the additional surfaces entail an impairment of the optical transmission. The additional components increase the system costs.

An extremely flexible adjustment without a strong enlargement of the area to be projected is proposed in U.S. Pat. No. 5,157,745. The adjustment of the individual channels is performed here by correction lenses disposed for displacement in a direction orthogonal on the optical path, which can be used, via adjustment, to achieve the high precision required for single-mode transmission. The solution is very complex and expensive because a high number of components must be subjected to a troublesome time-consuming adjustment process. The additional adjustment components render the transmission system bulky, heavy and expensive. This system is certainly well-suited for stationary applications such as those in radar installations, but in mobile applications, which involve the occurrence of shocks and vibrations, the optical system will become misaligned very soon. Apart therefrom, due to the high number of air/glass transitions a worse quality in transmission will be achieved than in comparable systems without such transitions.

In an approach to avoid the aforedescribed disadvantages according to U.S. Pat. No. 5,442,721, a bundle of conventional collimators is mounted as a complete unit into the transmitter. As a consequence, only a single adjustment of the entire collimator bundle is still required. A substantial disadvantage of such bundling resides, however, in the fact that the rather substantial tolerances of the individual collimators cannot be compensated. The individual collimators as such are composed of fiber mounts and lens systems that are fixedly interconnected in a ferrule. The mounting precision of these collimators is limited and, as a rule, does not satisfy the demands on a rotary transmitter system. Such an approach, in which individual adjustment of the collimators is no longer possible, is therefore not applicable specifically in a single-mode transmission system.

All the aforedescribed solutions involve the disadvantage that a sufficient optical precision cannot be achieved on account of lack of adjustment potentials or that adjustment is highly complex and unreliable in continuous operation. Moreover, none of the aforedescribed solutions permits the realization of high channel numbers with more than 5 to 10 channels.

SUMMARY OF THE INVENTION

An object of the present invention is to provide an optical transmission system for rotary or translational movements which avoids the aforementioned disadvantages and which an be realized with high numbers of channels at a high quality in transmission at low cost.

All the approaches in correspondence with the prior art attempt to realize a high accuracy at a high quality in transmission by, on one hand, a proper adjustment or, on the other hand, a simple adjustment at a low transmission quality. The present inventive device achieves a high precision and hence a high transmission quality with simple adjustment.

This is achieved by use of optical components configured as a micro-optical system which is produced from one piece by uniform processes. Hence, a micro-optical component is a multi-functional device in which the different sub-functions are created precisely by such a uniform process. Examples of the integration of several functions are lens arrays with many lenses, for instance, or also combinations of lenses and mechanical fiber mounts. Examples of the processes and manufacturing technologies suitable to this end are Liga, laser writing, and the like. They are frequently adopted from semiconductor technology or micro-system technology or are related to these processes, respectively. Hence, several partial components or functional parts can be manufactured in one process at maximum accuracy.

The use of a micro-optical system is particularly based on the recognition that, on one hand, the addition of tolerances can only be prevented by a uniform overall process and that, on the other hand, a reduction of the area to be projected reduces the optical paths and that hence the sensitivity to tolerances can be lowered.

In the prior art transmission systems, the optical components were separately produced by conventional optical manufacturing processes such as grinding and polishing of individual lenses. The lenses so produced are then composed, for instance, together with the glass fibers in a ferrule to form a collimator. In such a conventional manufacturing technology, the tolerances of all the individual process steps are added. These tolerances may be contour aberrations and dimensional tolerances of the lenses, positional errors of the lenses in the collimators, positional tolerances of the glass fiber relative to the lens, tolerances of the ferrule, and positional tolerances of the ferrule in the transmitter.

In an embodiment of the present invention, by contrast, many tolerances are precisely defined and reproducible already by the process specifications. For example, the distance between the individual optical systems are invariably predetermined with minimum tolerances in a lithographic process. A subsequent assembly or adjustment does not change anything in this situation. Certain process-dependent aberrations and tolerances, which can never be completely eliminated even though they can be minimized, are constant throughout the entire arrangement. For instance, a strabismus of the optical system, which is caused by the arrangement of the glass fiber with a shift to the lens, will be equal in all optical systems and can hence be compensated by a simple adjustment of the overall system. With individually manufactured components, by contrast, this strabismus exists in different degrees in different directions and can therefore be compensated only by individual adjustment.

With the configuration as micro-optical system as provided by the present invention, the area of the overall system can be reduced, which is to be projected, mostly by more than one order. Hence, the cross-sectional area and also the length of the de-rotating element can be reduced correspondingly. Consequently, shorter optical paths are formed, and hence higher qualities in transmission as well as lower sensitivity to mechanical tolerances are achieved.

In conclusion, the advantages of the inventive device can be summarized as follows:

The microtechnology permits the manufacture of these components with a precision that would not be possible in the case of an assembly of separate elements. The addition of individual manufacturing tolerances can be prevented. The distances between the structural elements are predetermined with minimum tolerances.

Due to the high positioning accuracy in micro technology, the outside contours of the components can be produced with centric fits so that the position relative to the axis of rotation need no longer be adjusted by the time of integration into the overall system.

Due to the smaller number of separate optical elements to be adjusted (and hence a smaller number of setting screws, adjusting flanges), the manufacturing costs are reduced but reliability is increased.

With the (quasi) monolithic structure of the optical systems on the input and output sides, complex and expensive adjustment operations on the individual channels are omitted or they can be considered within the scope of the manufacture of the components.

The distinctly smaller shape permits the use of less expensive mechanical parts, e.g. de-rotating element, bearings, gearings, or savings in costs, respectively.

As a result, an overall system with substantially smaller dimensions is also achieved. This opens up a great number of new applications.

The flexible manufacturing methods in micro technology permit easy adaptation to the required number of channels or the optical quality of the channels.

In the case of high-bit rate systems of the future, which are operated in the range of light wavelengths above 1,300 nm, silicon components can be used which are excellently suitable for micro structuring and display very good optical properties on account of the high refractive index.

Due to the generally reduced dimensions, the required free light path is shorter and along with this measure the losses in transmission are smaller.

It is also contemplated by the present invention, of course, to combine conventional manufacturing techniques with the inventive technology to create a transmission system. According to the invention, some channels for wide-band data transmission can be realized in micro system technology, for example, while additional channels involving lower demands, may be manufactured with synthetic light-conducting fibers in a conventional process.

It is equally conceivable to use micro-optical components on one side of the transmission system and conventional components on the other side. The optical components described here can also be employed for signal transmission between stationary components, e.g. in plugs, without any problems.

In a particularly expedient embodiment of the invention, the beam-guiding or beam-shaping elements include at least one active or passive optical element. This embodiment hence permits not only an indirect beam conduction or shaping, e.g. as mount for a light-conducting fiber to be guided, but also a direct conduction, e.g. through micro lenses. A combined embodiment with indirect and direct beam conduction or shaping is particularly expedient. Specifically the combination of a mount of the light-conducting fibers, which may be realized as a spline system, with micro lenses disposed in the optical path downstream of the fiber ends for collimation or focussing is suitable to implement, in an ideal manner, all the optical functions of an inventive transmission system in a single device. One piece of this device is provided on each mobile unit. Likewise, the function can be performed with an active element such as a laser diode with a lens disposed behind it. Active systems with micro-mechanical actuators can also be used.

The following special embodiments can be realized here without any problems:

Lens array: several lenses are applied on a support (e.g. conventional refractive, diffractive structures produced as Fresnel structures with manufacturing processes such as etching or stamping, which are common micro technology) which shape and deflect the radiation as desired, e.g. by collimation or focussing.

High-precision fiber lens array block made of one piece (quasi monolithic): the splines are machined in a silicon piece, like the lens elements associated with the splines.

In still another advantageous embodiment of the invention, the passive optical element may be an individual lens, for example. This may be expediently integrated by fastening the light-conducting fibers so as to form a single complete micro-optical collimator, for instance. Such micro assemblies can then be disposed in succession by micro-mechanical high-precision fits in any number whatsoever.

It is equally possible for the passive optical element to consist of a lens array. This lens array may comprise a one-dimensional, preferably linear, array. Two-dimensional arrays of the lenses are very expedient because they save space. For example, they may be disposed in a circular or square matrix or even with a lateral shift relative to each other. Three-dimensional arrays can also be realized with substantial advantage. Moreover, passive optical elements like guides for optical waveguides, especially light-conducting fibers, may be provided as well. These may equally have a one-, two- or three-dimensional configuration.

Another expedient embodiment of the invention is provided with integrated active optical elements. These may be light-emitting diodes, laser diodes or even photo diodes, for example.

According to a further advantageous embodiment of the invention, the active or passive elements are equally produced from one piece. For example, the monolithic combination of a laser diode with a lens or a fiber mount is of particular interest because in such a case all the important functions are integrated into a single unit.

Another expedient embodiment of the invention comprises beam-guiding or beam-shaping elements such as lenses that are manufactured in one piece together with guides of the coupling or decoupling components.

A further advantageous embodiment of the invention provides for the integration of beam-guiding and beam-shaping optical elements in a first structure. The coupling or decoupling elements are integrated into a second structure, with both structures being precisely aligned to each other via a positive locking element.

A lens array with a high-precision pitch (distance between the lenses) is fixedly mounted on an array formed of fibers, receivers or transmitters while the alignment is achieved either by a positive locking provision, e.g. via an optical flat as spacer (the thickness of the lens support can be tuned immediately with the focal length of the flat) and guiding fiber grooves for positioning or with a positive locking means realized in another form (cf. U.S. Pat. No. 5,446,815).

In yet another expedient embodiment of the invention, beam-guiding and beam-shaping optical elements are integrated into a first structure. The coupling or decoupling elements are integrated into a second structure, with the possibility to align both structures relative to each other and to fix them later on. In this manner, for example, the coupling or decoupling components are positioned with a match with the lenses, or vice versa. Hence a reciprocal specification of the positions is envisaged in manufacture. To this end, various alternatives are available:

- The individual fibers are disposed individually behind the lens array and then fastened there by an adhesive. This adjustment aspect is well known as seen, for example, in U.S. Pat. No. 5,559,915;
- The exposure determines the position of the fibers: By way of alignment through the focal point of the associated lens, the fiber guide is drilled individually for the fibers, e.g. by micro-processing techniques operating on an Excimer laser (the illumination of the lens arrays with a parallel beam generates focal points in an ideal positioning relative to the lenses, as far as the mutual positioning is concerned);
- The exposure determines the position of the lenses: An etching mask for the lenses is exposed through the fibers of a fiber array so that the etching masks for the lenses will be created at the suitable positions;
- The fibers are correctly positioned in an optimum manner by micro-mechanical actuator elements—active adjustment (e.g. "Cronos 3D Fiber Aligner"). This is carried out either once with subsequent fixing or continuously in the event of high demands on the rotary modulation.

According to another expedient embodiment of the invention, beam-guiding and beam-shaping optical elements are integrated in a first structure. The coupling or decoupling elements, respectively, are integrated in a second structure, with both structures being continuously adjustable relative to each other. With this provision, it is possible in particular to compensate continuous or even periodic variations. This form of adjustment may be implemented, for instance, by a micro-mechanical actuator that shifts the arrays relative to each other, for example, or also by a macro-mechanical actuator element such as, for example, a piezo ceramic element.

According to yet another further expedient embodiment of the invention, beam-guiding and beam-shaping optical elements are integrated in a first structure. The coupling or decoupling elements, respectively, are integrated into a second structure, with one structure being adapted to the other one in manufacture. Hence, first one of the structures is produced and then the second structure is produced with a match with the first one in such a way that the tolerances will be at a minimum.

In another expedient embodiment of the invention, beam-guiding and beam-shaping optical elements are integrated in a first structure. The coupling or decoupling elements, respectively, are integrated into a second structure. Here, both structures are configured as one- or multi-dimensional arrays corresponding to each other.

Due to the arrangement in arrays, a perfect mutual adjustment of the coupling or decoupling elements, respectively, and the lenses along three axes for all channels (2–n) will be ensured in the following ways:

- spacing of the arrays
- focal position of the lenses
- beam-shaping, alignment in both arrays along the two axes orthogonal on the optical axis
- parallelism of the optical axes of the individual beams relative to the mechanical axis of rotation or relative to each other in the case of individual positioning
- orientation of the beam.

For a precise adjustment it is only necessary to adjust the complete second array. According to an alternative, one of these arrays is provided with individual actuator elements on its components for adaptation of the position of the components to the corresponding component of the other structure.

In another advantageous embodiment of the invention, the beam-guiding or beam-shaping optical element is a photoactive medium. This medium is so configured that the projecting properties of the lenses adjust themselves appropriately in response to the irradiation through the coupling or decoupling elements.

According to a further particularly expedient embodiment of the invention, a de-rotating system is provided when at least one channel is to be transmitted outside the axis.

An advantageous aspect of the present invention resides in the fact that an active optical element is used as de-rotating system. This element is so designed that it creates the de-rotation by a change of its optical characteristics and need hence not be mechanically moved with the rotation.

Such an improvement of the invention presents the advantage that the omitted additional bearing and gearing components permit further savings in space and weight and that possibly even adjustment problems can be eliminated due to the adaptability of the optical element.

In another expedient embodiment of the invention, a photoactive medium is used as active optical element for de-rotation. The de-rotation is hence realized under control by the incident light. In a photoactive material, the projecting properties set themselves automatically in correspondence with the radiation from the coupling and de-coupling elements. The "precision" is here achieved rather by a self-adapting system that is also insensitive to misalignment. The de-rotating system is implemented in the form of a photoactive crystal whose optical properties are changed in response to the irradiation with the optical signals to be transmitted. When these signals are superimposed, a refractive index gradient is formed in the crystal (change of the refractive indices in response to irradiation), which ensures that the light of all coupled channels can also be coupled over into the receiving channels in an optimum manner. As this effect between the fibers determines the signal as such, i.e. the projection change in the crystal, changes in terms of position and direction of the individual channels do not result in an impairment of the transmission quality but only in an adaptation of the projecting properties of the crystal.

This means that the system re-adjusts itself continuously. Consequently, the rotation of the transmitting side, for instance, relative to the receiving side, does not play a role while the photoactive element need not follow this rotation. This solution is particularly expedient because any further control signals need not be supplied from the outside. In other words, this system is completely passive. Such a "neuronal optical system" has been described in "Efficient Self-Aligning Multi-Beam Coupling into a Single-Mode Fibre", Journal of Lightwave Technology, vol. 13, No. 1, January 1995.

This technology also permits the realization of the beam shaping, direction-determining and the optical de-rotation functions with a single optical element between the input and output components.

According to a further embodiment of the invention, an acousto-optic Dove prism is used as active optical element for de-rotation. The projecting properties of an inverting element such as a Dove prism are replaced by two acousto-optic beam deflectors and a cylindrical concave mirror therebetween. This element is then stationary and the rotation of the light beams is induced by the application of periodically varying light beams. Such a deflector system has been described in "Ultrafast Non-mechanical Image Rotation Using an Acousto-optic Dove Prism (AODP)" in: Optics and Photonics News/December 97.

A further embodiment of the invention provides for a passive optical element as de-rotating system. This element performs the de-rotation by way of its optical projecting function and need therefore not be rotated along with the principal movement.

In another embodiment of the invention, a passive optical element is used as a de-rotation system which is inverting. For this reason, this element must be rotated at half the angular velocity of the principal rotation. The inverting optical element of the de-rotating system (in one of the known designs such as the Dove prism, the inverting optical-fiber pipe, etc.) may be "actively adjusted" in case of low demands on low variations in attenuation, both once with subsequent fixing and continuously during operation. This may be performed by highly sensitive actuator elements such as piezo actuators that are re-controlled in the case of continuous adjustment via a control loop.

As on account of mechanical tolerances in the manufacture of an inverting optical element (e.g. the angular precision of the diffracting flanks in the Dove prism or the inaccuracies created in the Schmidt-Pechan prism by the cementing of two components) or on account of the adjustment of the optical axis of the inverting element relative to the axis of rotation, which cannot be achieved optionally with good results, tumbling movements of the focal point may occur—even in the case of fiber/lens arrays with ideal adjustment relative to the axis of rotation—unacceptable variations in attenuation would occur for some applications. A more stable signal could also be achieved via the rotation (smallest variation of attenuation possible) by an actively supported inverting optical element. In addition to the mechanical rough adjustment, the element would be mounted on both sides (on the rotor and stator sides) with at least one piezo actuator element and an associated opposite support in order to be able to set the optical axis of the prism with such a high sensitivity that it will coincide with the mechanical axis of rotation of the element or of the rotating fiber/lens array, respectively.

The piezo actuator element first of all entails the advantage that it permits much higher sensitivity in the movements than adjusting screws. It could hence be possible to align the actual optical axis of the prism once to the axis of rotation and fix it in this position. When the variations in attenuation are still too wide for a particularly demanding application, the adjustment could be continuously controlled in an adaptive manner also during the rotation so that then effects such as residual bearing play, gearing play or minute residual misalignment of the fiber/lens array could be corrected. The piezo actuator elements are then controlled via a control loop in such a way that the fibers in the array are always hit by the focal points of the lenses to a maximum extent.

Compared against the adjustment of individual fibers, this variant presents the advantage that only a small number of actuator elements is required, that these elements may be manufactured with larger dimensions and that only one channel must be interrogated for the control loop, rather than each channel individually. Moreover, a separate channel, through which further information is not transmitted, may be used exclusively for control purposes.

The size of the inverting optical element of the de-rotating system can be slightly shortened or simplified, as far as the manufacture in large quantities is concerned, by replacing the refractive surfaces of a prism or a lens by Fresnel structures or diffractive structures, respectively. An illustration of such a system has been published in "A New Type of Lens with Binary Subwavelength Structures", in: Optics and Photonics News, December 1997.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
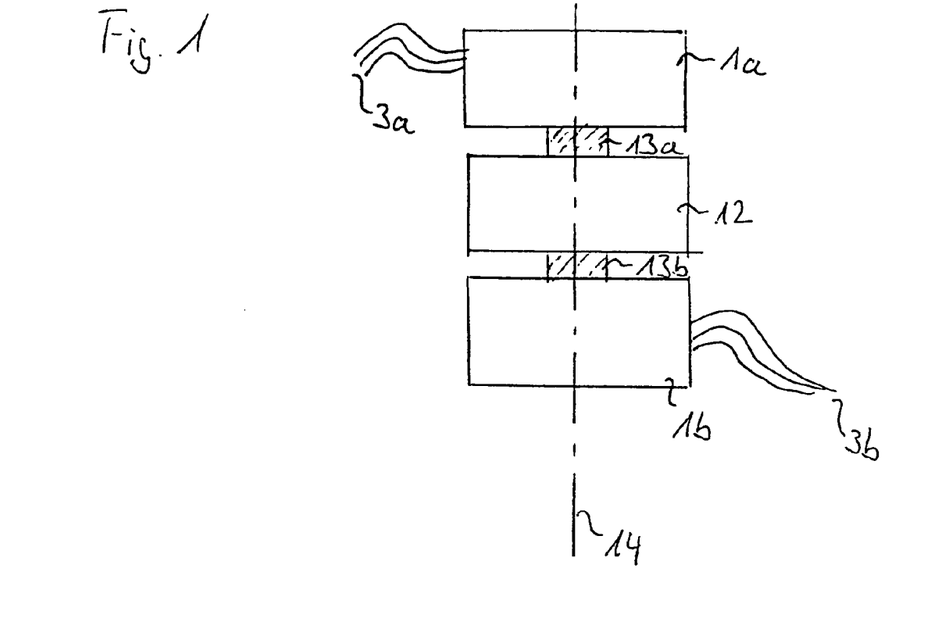
FIG. 1 is a schematic view showing a general embodiment of the present invention.

FIG. 1 illustrates, by way of example, a first collimator block (1a) and a second collimator block (1b) with a de-rotating element (12) disposed therebetween and arranged for rotation about an axis of rotation (14). The light-conducting fibers (3a, 3b) are guided in the respective collimator blocks that are configured as micro-optical components. Appropriately integrated lens systems are used to create parallel light pencils (13a, 13b). The latter are then projected by the de-rotating element (12) onto the respectively other collimator block.

Figure 2:
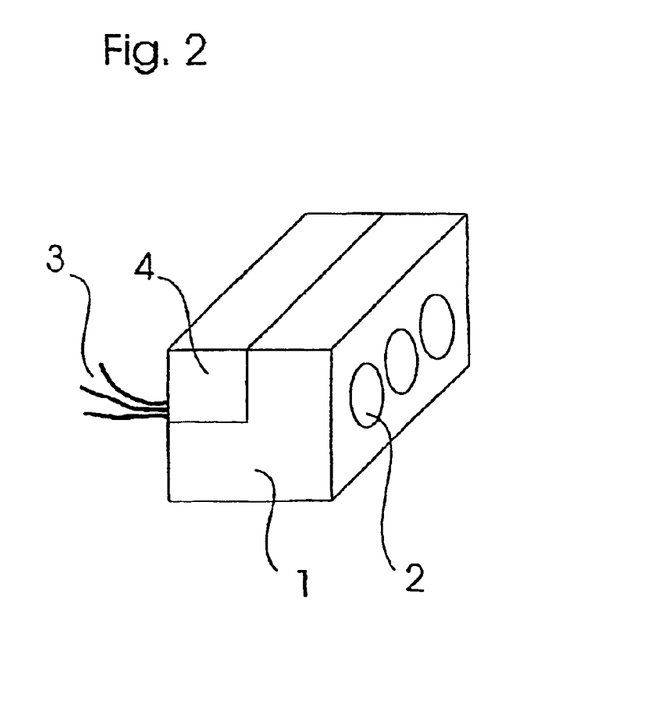
FIG. 2 is a perspective view of a monolithic collimator block.

FIG. 2 is an exemplary illustration of a monolithic collimator block (1) of the type used in FIG. 1. The lenses (2) as well as the mounts receiving the fibers (3) (not shown) are integrated into this block. The fibers are fastened, i.e. mechanically fixed, by a clamping block (4) in the positions predetermined by the fiber mounts.

Figure 3:
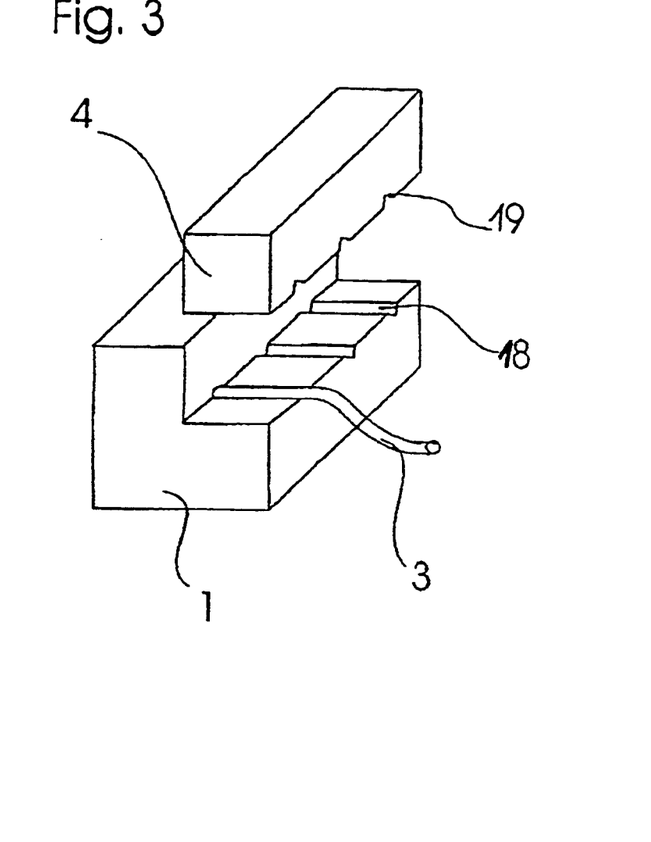
FIG. 3 is a perspective view of an opened monolithic collimator block structure of the block shown in FIG. 2.

FIG. 3 shows an opened collimator block (1) according to FIG. 2, seen from the rear side. Here, the fiber mount is configured in a bipartite form. For example, a first V-shaped groove (18) is provided in the collimator block directly, which corresponds to a second groove (19) in the clamping block. The fiber (3) is held between these two grooves.

Figure 4:
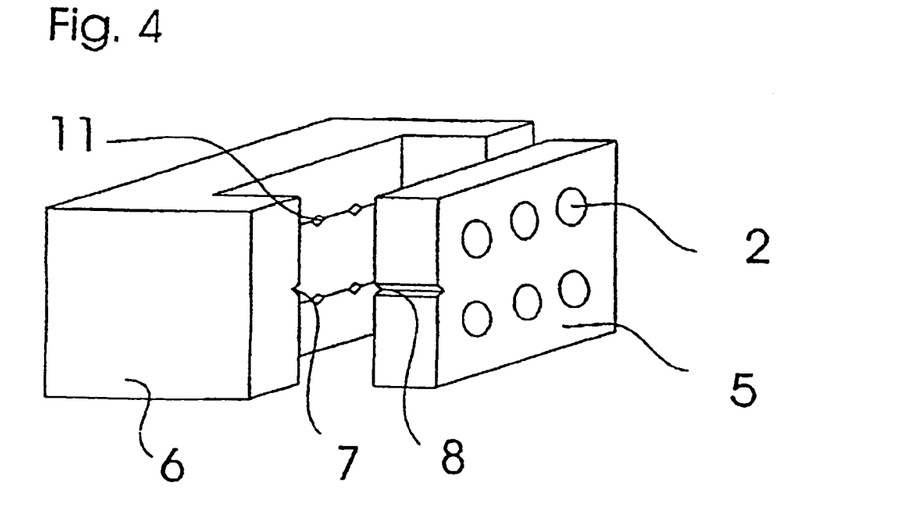
FIG. 4 is a perspective view illustrating the array positioning operation by way of positive locking connection.

FIG. 4 shows a modified embodiment of a micro-optical collimator system. In that modified configuration, a first groove (8) in the lens array and a second groove (7) in the fiber array are provided for the precise positioning between a lens array (5) that includes the individual integrated lenses (2) and the fiber array (6) that comprises guiding grooves (11) for the fibers. A dowel pin or even an appropriate fiber, for example, is inserted into the opening for mounting.

Figure 5:
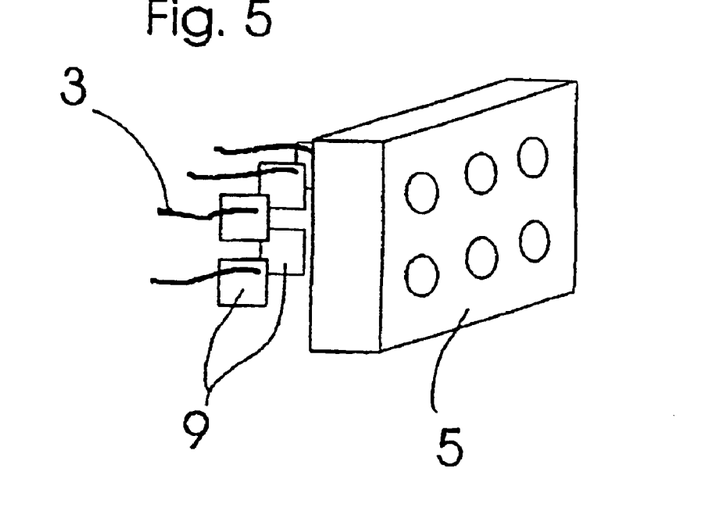
FIG. 5 is a perspective view showing a fiber mount with positioning elements.

FIG. 5 shows an arrangement in which the fiber mounts (9) with associated positioning elements are provided for precise positioning of the fibers (3). Such positioning elements may be micro-motors, fiber aligners and other devices.

Figure 6:
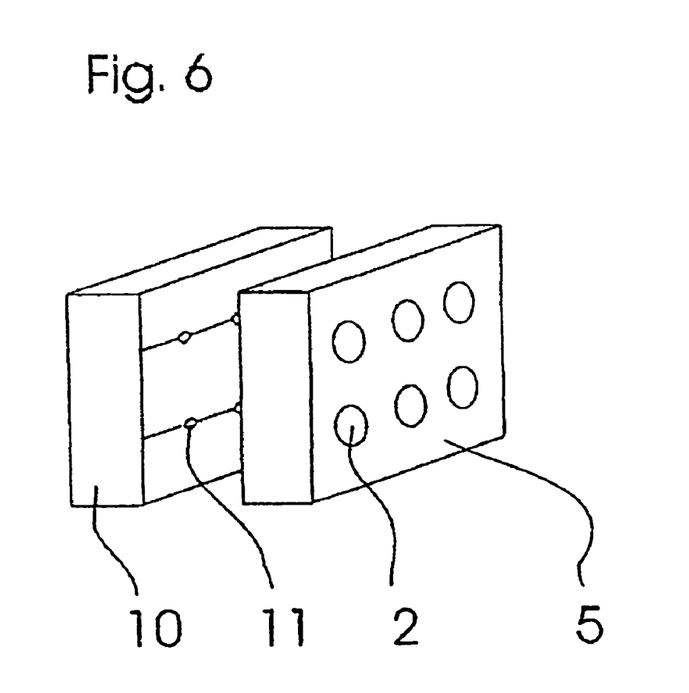
FIG. 6 is a perspective view of a two-dimensional array.

Finally, FIG. 6 illustrates an array including a fiber array support (10) composed of guiding groove plates stacked one on top of the other in a sandwich manner. The individual guiding grooves (11) are preferably V-shaped but may also be configured in a U-shape.

The invention claimed is:

1. Method for manufacturing an optical joint as an interface for a multiple channel transmission of optical signals between parts mobile for translation or rotation, comprising:
   forming a micro-optical component as a single, monolithic unit of optical elements selected from optical beam-guiding elements and optical beam-shaping elements;
   disposing the micro-optical component on one of at least two parts that are mobile in rotation or translation relative to each other during optical signal transmission; and
   a de-rotational optical system provided between the parts when at least one of the multiple channels is to be transmitted outside a rotational axis of a part.

2. Device manufactured according to claim 1, wherein said beam-guiding or beam-shaping elements contain at least one active or passive optical element.

3. Device manufactured according to claim 2, wherein a passive optical element is a separate lens, a lens array, or a guide for optical waveguides including light-guiding fibers.

4. Device manufactured according to claim 2, wherein an active element is a transmitter or a receiver comprising a laser diode or a photo diode, respectively.

5. Device manufactured according to claim 2, wherein said active or passive elements are machined out of the one piece.

6. Device manufactured according to claim 1, wherein said beam-guiding or beam-shaping elements are manufactured from the one piece together with guides for coupling or decoupling components.

7. Device manufactured according to claim 6, wherein said beam-guiding or beam-shaping optical elements are a photoactive medium in which properties of a lens array are appropriately formed as a result of irradiation through the coupling or decoupling components.

8. Device manufactured according to claim 1, wherein an active optical element serves as the de-rotating system to perform a de-rotation by a change of optical characteristics thereof without requiring to be rotated.

9. Device manufactured according to claim 8, wherein a photoactive medium is the active optical element provided for the de-rotation.

10. Device manufactured according to claim 8, wherein an acousto-optic Dove prism is the active optical element provided for the de-rotation.

11. Device manufactured according to claim 1, wherein a passive optical element is provided as a de-rotating system to perform the de-rotation by an optical projection function thereof without requiring rotation.

12. Device manufactured according to claim 1, wherein a passive optical element is provided as de-rotating system which is both inverting and rotated at half an angular velocity.

* * * * *